(12) United States Patent
Frayssignes et al.

(10) Patent No.: US 8,984,346 B2
(45) Date of Patent: Mar. 17, 2015

(54) METHOD FOR AUTOMATICALLY RELOADING SOFTWARE AND A DEVICE FOR AUTOMATICALLY RELOADING SOFTWARE

(75) Inventors: Anne Frayssignes, Saint-Andre (FR); Nicolas Caule, Toulouse (FR)

(73) Assignee: Airbus Operations SAS, Toulous (FR)

( * ) Notice: Subject to any disclaimer, the term of this patent is extended or adjusted under 35 U.S.C. 154(b) by 288 days.

(21) Appl. No.: 13/546,718

(22) Filed: Jul. 11, 2012

(65) Prior Publication Data
US 2013/0024727 A1 Jan. 24, 2013

(30) Foreign Application Priority Data

Jul. 18, 2011 (FR) ..................... 11 56512

(51) Int. Cl.
*G06F 11/00* (2006.01)
*G06F 11/10* (2006.01)
*G06F 11/14* (2006.01)

(52) U.S. Cl.
CPC ........ *G06F 11/1004* (2013.01); *G06F 11/1417* (2013.01); *G06F 11/1433* (2013.01)
USPC ........ 714/38.1; 714/6.1; 714/6.31; 714/38.14

(58) Field of Classification Search
CPC ............ G06F 11/1004; G06F 11/1433; G06F 11/1417; G06F 11/0739; G06F 11/143; G06F 11/1438; G06F 11/1441; G06F 11/1448; G06F 11/1458; G06F 11/1469; G06F 11/3013

USPC .............. 714/38.1, 2, 6.1, 6.24, 16, 6.31, 15, 714/38.14, 42, 48
See application file for complete search history.

(56) References Cited

U.S. PATENT DOCUMENTS

| | | | |
|---|---|---|---|
| 5,925,140 A | 7/1999 | Hudson | |
| 7,617,029 B2 * | 11/2009 | Loda | 701/31.6 |
| 2003/0033553 A1 * | 2/2003 | Liu | 714/1 |
| 2003/0093708 A1 | 5/2003 | Ali-Santosa et al. | |
| 2004/0199809 A1 | 10/2004 | Hanam et al. | |
| 2005/0125660 A1 | 6/2005 | Raciborski | |
| 2008/0235501 A1 | 9/2008 | Bailey et al. | |
| 2009/0138517 A1 * | 5/2009 | McLain et al. | 707/104.1 |
| 2009/0150714 A1 * | 6/2009 | Gasperson | 714/2 |
| 2011/0016358 A1 * | 1/2011 | Randimbivololona et al. | 714/38 |
| 2011/0252295 A1 * | 10/2011 | Beacham et al. | 714/807 |

OTHER PUBLICATIONS

French Preliminary Search Report issued on Feb. 13, 2012 in corresponding French Application No. 11 56512 filed on Jul. 18, 2011 (with an English Translation of Categories).

* cited by examiner

*Primary Examiner* — Joseph D Manoskey
(74) *Attorney, Agent, or Firm* — Oblon, McClelland, Maier & Neustadt, L.L.P.

(57) ABSTRACT

Method for automatically reloading software characterized in that it comprises: a step of detecting corruption (E101) of at least one part of a software package of an on-board programmable device (10-1, 10-2, 10-*n*); and, in response to signaling, a step of reloading (E103) a non-corrupt version of the said at least one corrupt part of the software in order to replace the said at least one corrupt part of the software.

14 Claims, 6 Drawing Sheets

METHOD FOR AUTOMATICALLY RELOADING SOFTWARE AND A DEVICE FOR AUTOMATICALLY RELOADING SOFTWARE

This invention relates to a method for automatically reloading software and a device for automatically reloading software.

Software corruption is a phenomenon which may lead to loss or damaging of data and to malfunctioning of the data-processing systems. A great many factors may be the cause of a software corruption. For example, corruption may be due to an error during transfer of the data (loading), to an error in the software itself (overflows, . . . ), or to aging of the memory containing the data in question. In the aeronautical field, such a corruption may be the result of an ionic bombardment to which the on-board equipment items, also called computers, are subject in an aircraft during high-altitude flights, in particular during long-haul flights. The longer a software package remains exposed to sources of corruptions, the more the probability of occurrence of a corruption increases. This may be the case, for example, for high-altitude flights of long duration or for software versions that have not changed for many years.

Certain on-board computers are able to detect corruption of the software installed in the computer during loading of the software or during use of the computer.

Detection of a software corruption may lead the computer to declare all or part of its software unusable and to signal a failure to the centralized maintenance system. In the most problematic case, the software in charge of communicating with the aircraft may itself be corrupt, which possibly may bring about a failure of the said system without the possibility of signaling the cause of the failure in question.

This type of failures leads to investigatory maintenance procedures, possible removal of computers (with return and repair at the supplier's premises) and therefore potentially high maintenance costs as a whole.

This invention is intended to overcome at least one of these drawbacks.

To this end, a first aspect of the invention relates to a method for automatically reloading software comprising a step of detecting corruption of at least one part of a software package of a programmable device on board an aircraft; and, in response to detection of corruption, a step of automatically reloading a non-corrupt version of the said at least one corrupt part of the software in order to replace the said at least one corrupt part of the software, in which the step of reloading the software (E103) is delayed until an operational phase of an aircraft in which the programmable device is carried during which a software loading is authorized, the operational phases during which a software loading is authorized being determined according to at least one of the following factors: the position of the aircraft in relation to the ground, the speed of the aircraft, the state of the engines of the aircraft and the refueling state of the aircraft.

For example, in an embodiment of the invention, the step of reloading cannot be started during a landing phase of the aircraft, a take-off phase of the aircraft, a ground phase during which the speed of the aircraft is greater than 80 kts or a flight phase during which the speed of the aircraft is below 80 kts.

Automatic reloading of all or part of a software package in response to detection of a corruption of the said software makes it possible to automatically solve the problem of corruption of on-board software packages. In this way, in the aeronautical field, for example, a lay-up of the aircraft for a maintenance procedure can be avoided.

According to an embodiment, the step of detecting includes calculating a verification code for the software and comparing the verification code with a reference code. For example, the verification code may comprise a cyclic redundancy check CRC code.

In an embodiment of the invention, the step of detecting corruption is carried out by the on-board programmable device and the method further includes a step of signaling the corruption to a loading management device.

According to an embodiment, the step of signaling the corruption comprises the transmission of a loading request in the form of a frame having an identification code and containing an identification of software to be reloaded and/or an information item on location of the said at least one corrupt software part.

In a specific embodiment of the invention, the step of comparing the verification code with a reference code is performed by the on-board programmable device. In another embodiment, the step of detecting further comprises periodically transmitting, to the loading management device, the verification code calculated by the on-board programmable device in order to enable the loading management device to carry out the step of comparing the verification code with a reference code.

In an embodiment, transmission of the reloading request by the on-board programmable device may be delayed or the step of reloading by the loading management device may be delayed.

According to an embodiment, the loading request may be relayed to a loading device located on the ground in order to perform reloading of the said non-corrupt version of the software.

In an embodiment, a notification is transmitted to a maintenance system after the step of reloading in order to confirm completion of reloading of the corrupt software.

A second aspect of the invention relates to a loading management device on board an aircraft including a notification processing unit adapted for processing a notification transmitted by a programmable device on board the aircraft indicating corruption of at least one part of a software package of the on-board programmable device; and a loading unit adapted for obtaining a non-corrupt version of the said at least one corrupt part of the software and loading it into the on-board programmable device in response to the notification, the loading unit being able to delay loading of the software until an operational phase of the aircraft in which the programmable device is carried during which a software loading is authorized.

In an embodiment, the notification comprises a loading request indicating detection of corruption of the said at least one corrupt part of the software.

In another embodiment of the invention, the notification comprises a verification code calculated by the on-board programmable device and the notification processing unit may be adapted for comparing the verification code calculated by the on-board programmable device with a reference code so as to determine the said corruption. For example, the verification code may comprise a cyclic redundancy check CRC code.

In a specific embodiment of the invention, the loading unit is adapted for delaying the step of reloading the software until an operational phase of an aircraft, on which the programmable device is carried, during which a software loading is authorized.

For example, the functional phases during which a software loading is authorized may be determined according to at least one of the following factors: the position of the aircraft in relation to the ground, the speed of the aircraft, the state of the engines of the aircraft and the refueling state of the aircraft.

In an embodiment, the notification processing unit is adapted for relaying a loading request to a loading device located on the ground in order to perform reloading of the software.

According to an embodiment, the loading management device is configured for sending a notification to a maintenance system after the step of reloading in order to confirm completion of reloading of the corrupt software.

A third aspect of the invention relates to a programmable device carried in an aircraft including a software verification unit enabling detection of a corruption of at least one part of a software package of the on-board programmable device; a signaling unit adapted for signaling an indication of corruption to an on-board loading management device; and a loading unit adapted for replacing the said at least one corrupt part of the software with a non-corrupt loaded version, the loading unit being able to delay loading of the software until an operational phase of the aircraft in which the programmable device is carried during which a software loading is authorized.

In an embodiment, the verification unit is adapted for performing calculation of a verification code for the software and comparison of the verification code with a reference code. For example, the verification code comprises a cyclic redundancy check CRC code.

In another embodiment, the verification unit is adapted for performing calculation of a verification code for the software and the signaling unit is adapted for periodically transmitting the calculated verification code to the loading management device in order to enable the loading management device to carry out the step of comparing the verification code with a reference code.

According to a specific embodiment, the signaling unit is adapted for transmitting a loading request in the form of a frame having an identification code and containing an identification of software to be reloaded and/or an information item on location of the said at least one corrupt software part.

A fourth aspect of the invention relates to a communication system for an aircraft characterized in that it includes: an on-board loading management device according to the second aspect of the invention; at least one on-board programmable device according to the third aspect of the invention; and a software storage device for storing a non-corrupt version of the software of the said at least one on-board programmable device.

A fifth aspect of the invention relates to a computer program including instructions for the use of a method according to the first aspect of the invention when it is loaded and run by a processor of a communication system, as well as a computer program product and a storage medium for such program and product.

A sixth aspect of the invention relates to an aircraft comprising an on-board loading management device according to the second aspect of the invention; and an on-board programmable device according to the third aspect of the invention.

The aircraft further may comprise a software storage device for storing a non-corrupt version of the software of the said at least one programmable device.

Other features and advantages of the invention will become apparent in the description below, illustrated by the attached drawings, in which.

—The invention is illustrated below through examples taken from the aeronautical field, but generally relates to any type of data-processing systems liable to be exposed to a software corruption.

Figure 1:
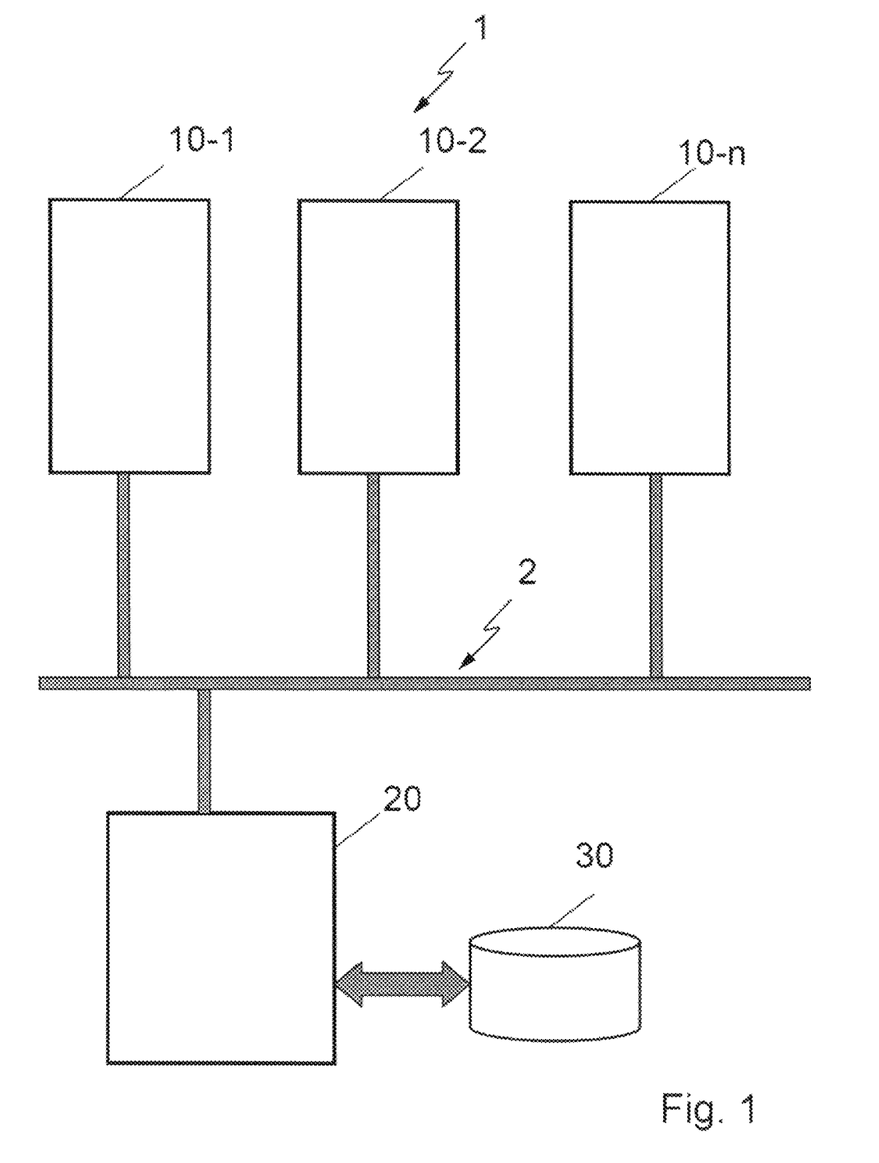
FIG. 1 schematically shows a communication system of an aircraft.

FIG. 1 schematically illustrates a communication system 1 installed in an aircraft according to at least one embodiment of the invention. This system 1 is based on a digital network architecture of Ethernet type adapted to aeronautics and called ADCN network ("Avionics Data Communication Network") using the AFDX ("Avionics Full DupleX switched Ethernet") technology. Network 2, which is referred to below as AFDX network in connection with the associated communication technology, interconnects, between them, a plurality n of on-board equipment items 10-1, 10-2 . . . 10-n, that is to say equipment items carrying out functions specific to the aircraft. These on-board equipment items also are called computers or LRU ("Line Replaceable Units"). In the on-board systems, it is known that the computers are duplicated for reasons of security. For the remainder of the description, these redundant computers are likened to the independent computers of system 1.

Network 2 is a digital switching network in which different switches direct the conveyed data from one AFDX bus section to another AFDX bus section. These switches are seen here as directing equipment items not changing the content of the conveyed data. Each computer 10-1, 10-2 . . . 10-n is connected directly to a switch, called "corresponding switch" which is "its" point of entry into network 2.

Each computer is equipped with a data-processing system loaded with a software package in order to perform one or more functions of the on-board equipment.

Computers 10-1, 10-2 . . . 10-n are connected by means of ADCN network 2 to a loading management device 20 (also called DLCS—Data Loading & Configuration System). Loading management device 20 is configured for managing the loading of software packages of computers 10-1, 10-2 . . . 10-n. Management device 20 is equipped with a communication interface for communicating with a device 30 for storage of software packages so as to retrieve the software to be loaded to the computer in question. In certain embodiments of the invention, the device 30 for storage of software packages is carried, for example on board an aircraft. In other embodiments the device 30 for storage of software packages is on the ground.

Figure 2:
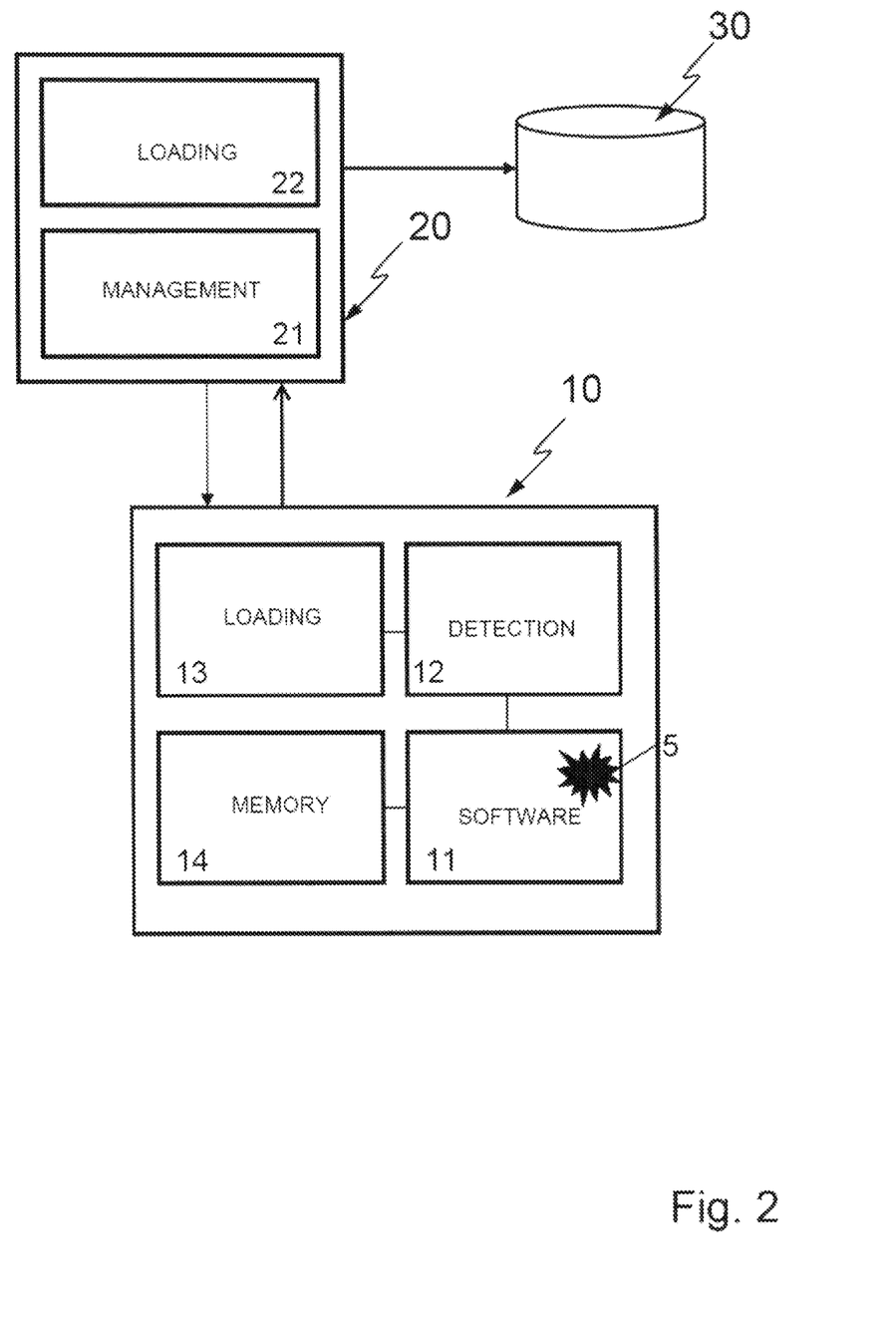
FIG. 2 schematically shows a software reloading system according to a first embodiment of the invention.

Components of the communication system according to a first embodiment of the invention are described in more detailed manner with reference to FIG. 2. In this embodiment, computer 10 is equipped with a loadable software package 11. The code of the software is stored in a memory for the code of the computer. The computer further includes a software corruption detection module 12, a software loading module 13 and a memory 14 for storing configuration data and a database. Software corruption detection module 12 is configured for detecting a corruption of the code of software package 11. Detection may be done directly during loading of the software code or else during running of the software code. Detection module 12 is configured for performing the detection through a verification process comprising a step of calculating a verification code or signature such as a cyclic redundancy check code called CRC ("Cyclic Redundancy Check"), a parity check or an MD5 code, for example.

By way of example, in the first embodiment of the invention, software corruption detection module 12 is configured for verifying a CRC code so as to determine whether software 11 or a part of software 11 is corrupt. To accomplish this, software corruption detection module 12 calculates a CRC code, either on each of the files contained in software 11, or on all of software 11 itself, or both on the files and on the software. Then software corruption detection module 12 compares the "files" CRC code and/or the "software" CRC code with the corresponding reference CRC codes which were calculated on the ground during development of the software. The CRC codes calculated on the ground are contained in a special file of software 11 in the heading "HEADER" which generally is the first component to be loaded into computer 10 during loading of the software.

Moreover, detection of software corruption may be done well after loading of software 11 to computer 10 has taken place, during use of computer 10, by employing methods similar to those applied during loading. A CRC calculation may be performed at a moment of time T or following an event such as a startup (boot), a reset, a switching on, a transition of the aircraft from the "on ground" to "in flight" state, on all or part of the code of software 11 or on data stored in memory 14. A regular verification of the CRC code may be performed in order to verify that the CRC does not change at a time T+X or following a new occurrence of the event.

In this embodiment of the invention, corruption detection module 12 is situated in an independent memory zone of said software 11 to be verified, so as not to be exposed to corruption itself. The design assurance level called DAL "Design Assurance Level" of the software of corruption detection module 12 is equal to or greater than the DAL of software 11 to be protected. In a variant, corruption detection module 12 may be part of the main software for communication with the aircraft.

Loading module 13 "dataloading agent" is in charge of processing the loading protocol for the software. It is configured for transmitting to management device 20 a request for software loading in response to a detection of software corruption by corruption detection module 12.

By way of example, the reloading request transmitted by loading module 13 may be a simple user datagram protocol frame called UDP ("User Datagram Protocol") and identified by a specific UDP port number. The request may contain, in ASCII form for example, the reference of the software or component of the software to be reloaded and/or the identification of the target of the loading process. By way of example, the target may be identified for example by a FIN SW ("Functional Item Number SW") which constitutes an invariant identifying in a unique and unambiguous manner the position of any software on board an aircraft of the company AIRBUS (for example: 50911-1SE1SW4-HNP5CABCDEFG123).

Loading module 13 is configured for transmitting a reloading notification to loading management device 20 after a reloading of software. This notification indicates the configuration of the loaded software.

In other embodiments, loading module 13 may be part of the operational partition of computer 10 or of software corruption detection module 12 detecting the corruption. In a variant, loading module 13 may constitute a local correspondent, situated in on-board computer 10, of a centralized loading system of the aircraft.

The loading request may be transmitted by loading module 13 only once, as many times as necessary to obtain acknowledgment of receipt by loading management device 20 or cyclically until reloading of the corrupt software.

Centralized loading management device 20 includes a management module 21 configured for automatically processing loading requests received from the loading module of a computer 10. Device 20 also includes a loading module 22 configured for loading software packages from software storage device 30 in accordance with loading protocols, such as ARINC615 for example. Management module 21 is designed or adapted for transmitting, if necessary, an acknowledgement so as to confirm receipt of a loading request and to open a protocol for loading the software on the target specified in the loading request, in response to receipt of a reloading request. Loading module 22 is configured for retrieving the replacement software from software storage device 30.

In a specific embodiment of the invention, the reloading request and the acknowledgment thereof by the centralized loading system may be formatted on the principle of exchanges of ARINC 615A protocols (or else be tftp-type reading or writing requests from the equipment to software storage device 30.

Management module 21 is adapted for verifying, after a reloading process, that computer 10 indeed contains the software that it has just reloaded, on the correct SW (FIN) position, and with the correct configuration. Management module 21 is adapted for automatically validating the configuration of the software (or updating the validation date), then for signaling either to the centralized maintenance system or to the centralized warning system (Flight Warning System in English) or simply for storing in memory the fact that it has just reloaded a software package.

In a variant of the invention, a corruption detection module may be provided in two different places (duplication) of computer 10, for example in the boot code of the software of the computer and in the main software for communication with the aircraft so that corruption of one of the software packages may be processed by the other software.

Figure 3:
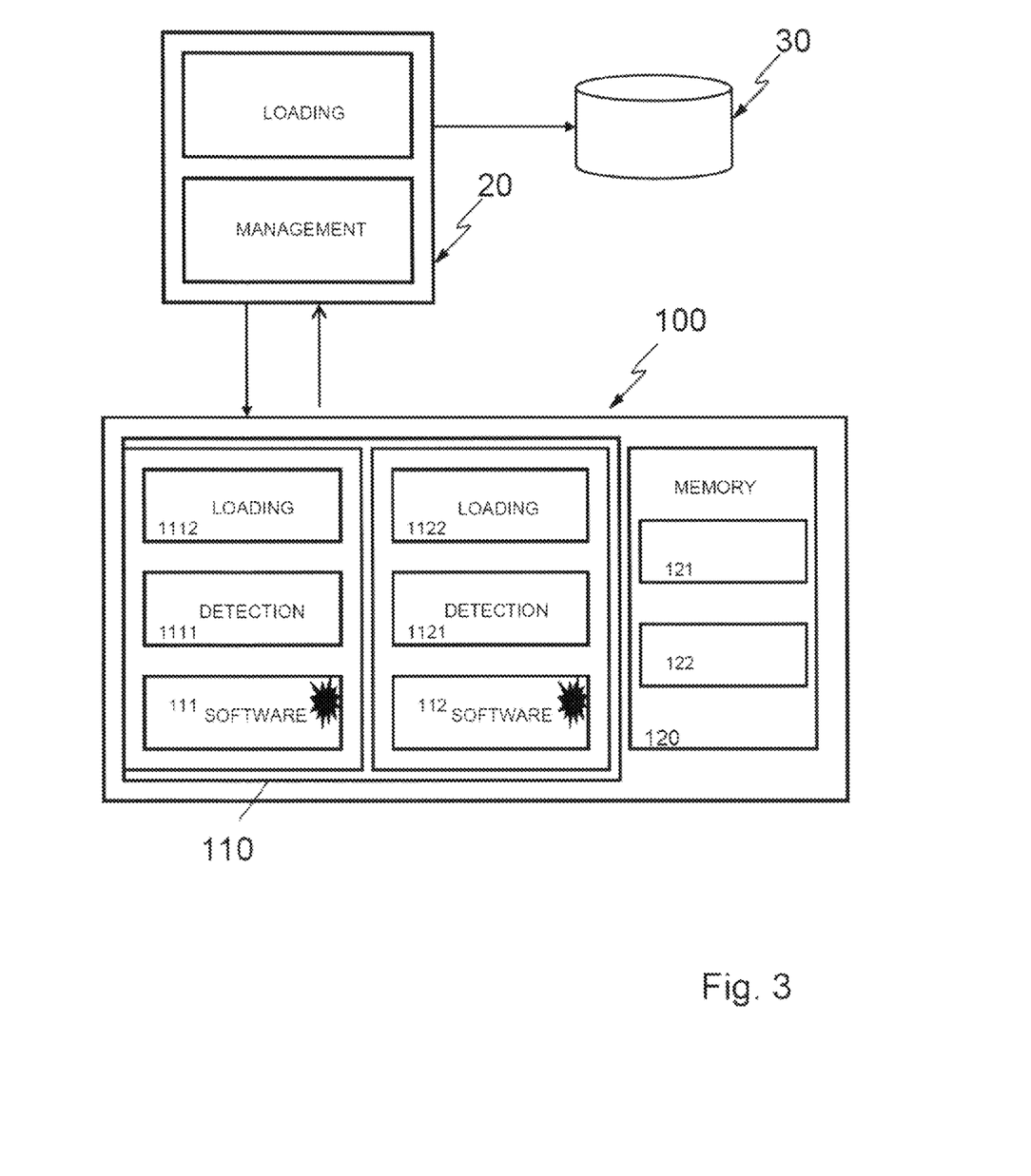
FIG. 3 schematically shows a software reloading system according to a second embodiment of the invention.

In the second embodiment illustrated on FIG. 3, a computer 100 is equipped with a loadable software program 110 having several components including a startup (BOOT) software component 111 and a background task component (Core in English) 112. Computer 100 is equipped with a memory system 120 for storing configuration data 121 and a database 122. Software packages 111 and 112 respectively have a software corruption detection module 1111 and 1121 and a loading module 1112 and 1122. Each corruption detection module 1111 and 1121 is configured for detecting a corruption of respective software 111 and 112. Moreover, corruption detection module 1111 may be configured for detecting a corruption of software 112 and corruption detection module 1112 may be configured for detecting a corruption of software 111. Corruption detection may be performed in a manner similar to that of the first embodiment described above.

Figure 4:
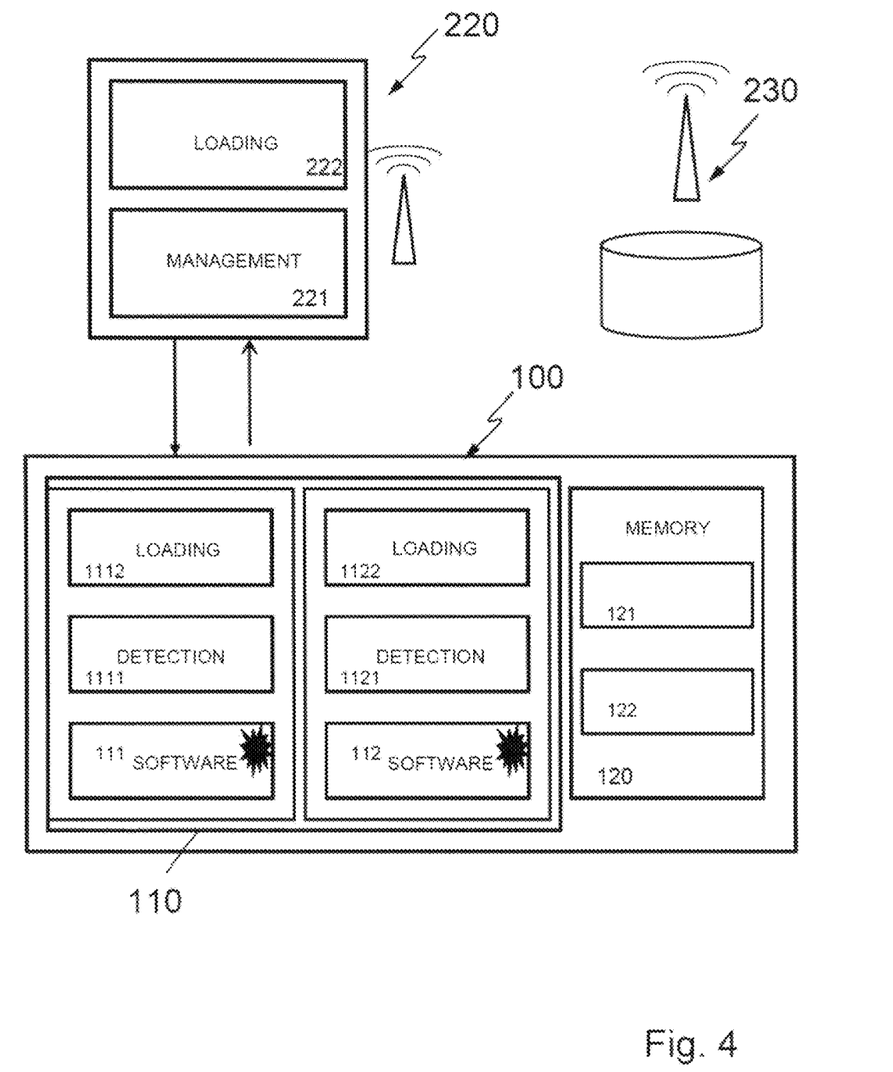
FIG. 4 schematically shows a software reloading system according to a third embodiment of the invention.

In another variant of the invention illustrated on FIG. 4, software storage device 230 is situated on the ground. In this embodiment, loading module 222 of loading management device 220 is configured for relaying a loading request to software storage device 230 on the ground. Software storage device 230 automatically sends back the requested software also called FLS (Field Loadable SW). Upon receipt, on-board loading management device 220 starts the protocol for loading to computer 100 as described above.

A method for automatic software reloading according to an embodiment of the invention now is going to be described with reference to FIG. 5.

In a first step E101, corruption detection module 12 for the software of computer 10 detects a software corruption. To accomplish this, detection module 12 of computer 10 performs a process of verification of a code or of a signature, for example through calculation of a CRC code and comparison of the calculated CRC code with a reference CRC code as described above.

Following detection of corruption of software 11, the corruption is signaled to centralized loading management device 20 in a step E102. To accomplish this, loading module 13 of computer 10 transmits a loading request to centralized loading management device 20.

The loading request may be transmitted by loading module 13 of computer 10:

1) upon detection of corruption by detection module 12, or else 2) stored in memory and its transmission delayed until the moment when computer 10 enters an operational phase in which loading is authorized. This loading is authorized according to the calculation logic that computer 10 itself already uses in order to "protect" itself from untimely loading requests or to purely and simply inhibit loading in flight phases of the aircraft on which computer 10 is carried (engines turned on and/or aircraft in flight, for example) or under conditions (fueling, aircraft on support props and landing gear retraction-extension tests in progress, for example) that the equipment considers as incompatible with a safe (non-hazardous) operation.

Depending on the case (1) or (2) above, centralized loading management device 20 processes the request received (respectively):

1. (case of request immediately transmitted by the computer). When software loading is authorized at the aircraft level, that is to say that the aircraft is in maintenance phase according to the calculation logic specific to centralized loading management device 20 (aircraft on the ground and engines turned off); the phase referred to as "maintenance" is the rated phase for performing loadings; or 2. (case of request delayed by the computer) immediately so as to perform loading of the software to the computer only in an authorized flight phase.

Figure 6:
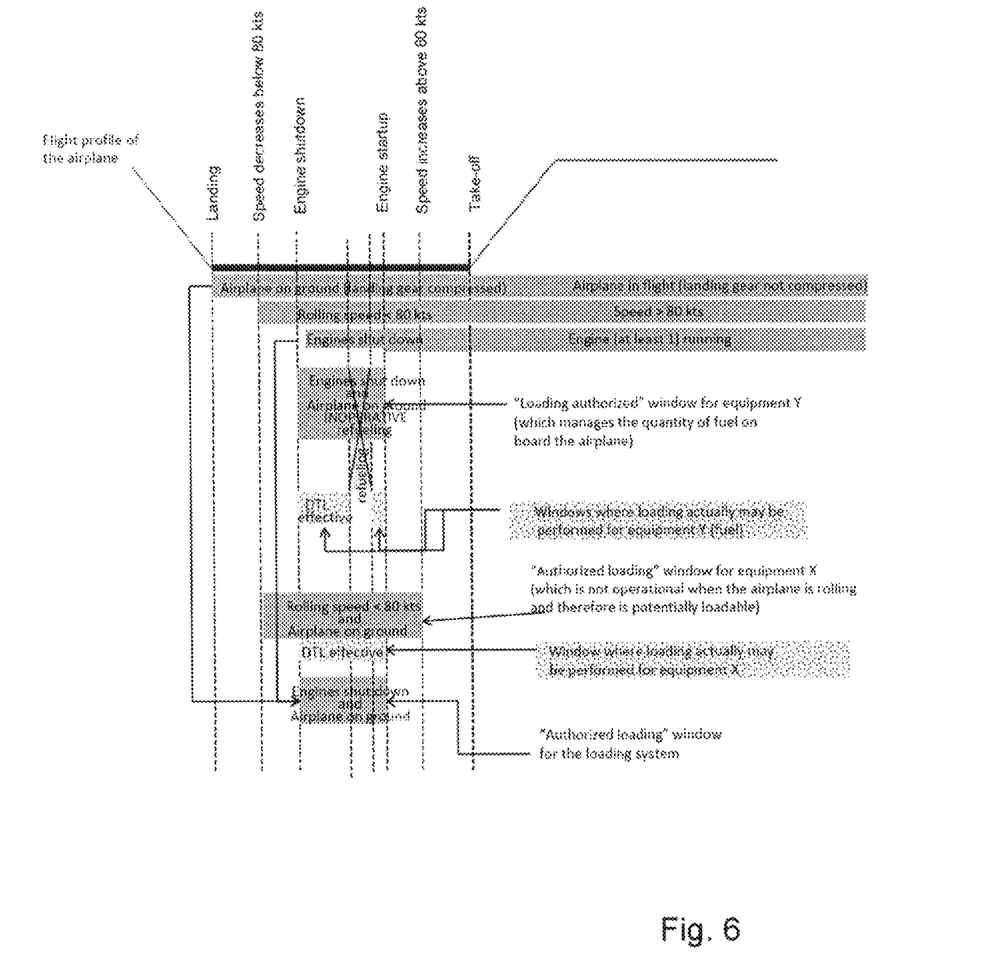
FIG. 6 illustrates an example of authorized loading phases for an aircraft.

FIG. 6 shows an example of operational phases during which software loadings are authorized according to the position of the aircraft (on the ground or in flight), the roll speed, shut-down or turned-on state of the engines, loading of fuel. These phases are seen by computers 10 and loading management device 20 in the form of time windows the coincidence of which enables communication between computer 10 and loading device 20 and therefore automatic software reloading.

For example, for certain computers a step of software reloading may not be started during a landing phase of the aircraft, a takeoff phase of the aircraft, a ground phase during which the speed of the aircraft on the ground is greater than 80 kts or a flight phase during which the speed of the aircraft in flight is below 80 kts. By way of example, for a computer that manages the quantity of fuel on board the airplane, loading of the software is not authorized during a phase of loading of the fuel. For a computer that is not operational when the aircraft is rolling, loading of the software is authorized when the aircraft is on the ground and the rolling speed is less than 80 kts.

In the case in which determination of the condition of state of the engines is a failure, the loading system implementing "an AND logic" for this condition with the condition "aircraft on the ground" cannot start any loading. The same is true for loadable equipment items.

Figure 5:
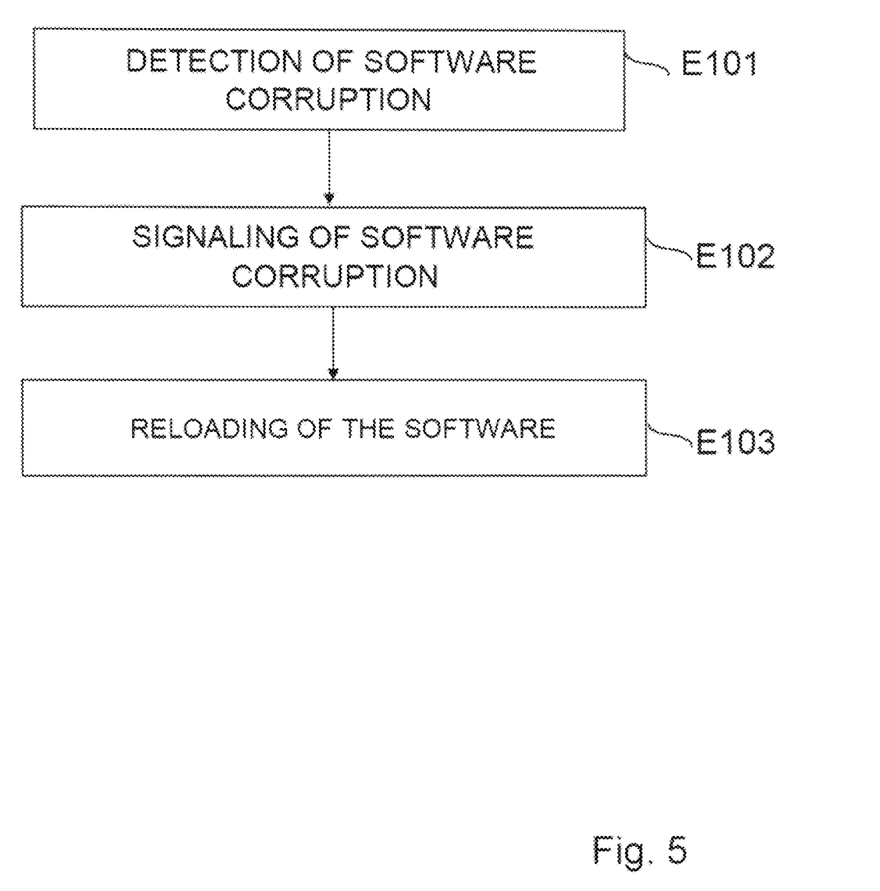
FIG. 5 illustrates the software reloading operations according to an embodiment of the invention.

Reverting to FIG. 5, in a step E103 after receipt of the reloading request, the centralized loading management device, if need be, transmits an acknowledgment and opens, during an authorized loading phase, a protocol for loading the software on the target specified in the loading request. The reloading software is retrieved from software storage device 30 and loaded to specified computer 10.

At the end of the step of reloading the software, loading management device 20 verifies that computer 10 indeed contains the software that it has just loaded, on the correct position of the software code, automatically validates the configuration of the software (or updates the validation date) then signals either the centralized maintenance system, or the centralized warning system (Flight Warning System) or simply stores in memory the fact that it has just reloaded a software package.

In certain embodiments of the invention, a message may be sent to a centralized maintenance system confirming a reloading operation as the result of software corruption, so as to cut short any ground investigation from then on having become pointless.

In certain embodiments, the computer detecting the corruption may send an error message to the centralized maintenance system only if and exclusively if the loading management device does not complete the requested reloading.

In another variant of the invention, the mechanism for detection of software corruption may be situated in the centralized loading management device. In a specific embodiment, CRC codes calculated for all the software packages of a computer may be sent periodically to the loading management device. The loading device then may compare these received CRC codes with the CRC codes of the image of each software package contained in its storage zone said to be robust to data corruption or else transmit these CRCs to the ground in the case of the variant of FIG. 4. If the CRCs are not identical, the reloading procedure described above may be started.

This invention thus makes it possible to signal a software corruption from an on-board equipment item directly to a centralized loading device so as to automatically set in motion a reloading of all or part of the corrupt software. Consequently the corrupt software or the corrupt part of the software may be replaced by a non-corrupt version, in this way avoiding a lay-up of the aircraft for a maintenance procedure.

The preceding examples are only embodiments of the invention which is not limited thereto.

In particular, although the invention has been described in the aeronautical field, the simulation system according to the invention may apply to any type of vehicle carrying a system, in particular a motor vehicle, a train or a ship.

Furthermore, any communication network, in particular digital and/or switching, is included under this invention, and not only the Ethernet networks.

The invention claimed is:

1. A method for automatically reloading software, comprising:

detecting, by a programmable device on board an aircraft, corruption of at least a part of a software package of the programmable device on board the aircraft;

automatically reloading, in response to detecting corruption, a non-corrupt version of the at least one corrupt part of the software in order to replace the at least one corrupt part of the software; and delaying the reloading of the software until a time when the aircraft in which the programmable device is carried enters an operational phase in which software loading is authorized, the operational phase during which software loading is authorized being determined according to at least one of a position of the aircraft in relation to the ground, a speed of the aircraft, a state of engines of the aircraft, and a refueling state of the aircraft.

2. The method according to claim 1, wherein the detecting includes
calculating a verification code for the software, and
comparing the verification code with a reference code.

3. The method according to claim 2, wherein the verification code includes a cyclic redundancy check CRC code.

4. The method according to claim 2, wherein the detecting further includes periodically transmitting the verification code calculated by the calculating to a loading management device in order to enable the loading management device to carry out the comparing of the verification code with the reference code.

5. The method according to claim 1, further further comprising signaling the corruption detected by the detecting to a loading management device.

6. The method according to claim 5, wherein the signaling further includes transmitting to a loading management device a loading request in a form of a frame having an identification code and containing at least one of an identification of software to be reloaded and an information item on location of the at least one corrupt software part.

7. The method according to claim 1, further comprising relaying a loading request to a loading device located on the ground in order to perform the reloading of the non-corrupt version of the software.

8. The method according to claim 1, further comprising transmitting a notification to a maintenance system after the reloading in order to confirm completion of reloading of the non-corrupt version of the software.

9. A loading management device on board an aircraft, comprising:
a notification processing unit configured to process a notification transmitted by a programmable device on board the aircraft indicating corruption of at least one part of a software package of the on-board programmable device; and
a loading unit configured to obtain a non-corrupt version of the at least one corrupt part of the software and load the non-corrupt version into the on-board programmable device in response to the notification, the loading unit being configured to delay loading of the software until a time when the aircraft in which the programmable device is carried enters an operational phase in which software loading is authorized.

10. An on-board programmable device in an aircraft, comprising:
a software verification unit configured to enable detection of a corruption of at least one part of a software package of the on-board programmable device;
a signaling unit configured to signal an indication of the corruption to an on-board loading management device; and
a loading unit configured to enable replacement of the at least one corrupt part of the software with a loaded non-corrupt version, the loading unit being configured to delay loading of the software until a time when the aircraft in which the programmable device is carried enters an operational phase in which software loading is authorized.

11. A communication system for an aircraft, comprising:
an on-board loading management device including
a notification processing unit configured to process a notification transmitted by a programmable device on board the aircraft indicating corruption of at least one part of a software package of the on-board programmable device, and
a loading unit configured to obtain a non-corrupt version of the at least one corrupt part of the software and load the non-corrupt version into the on-board programmable device in response to the notification, the loading unit being configured to delay loading of the software until a time when the aircraft in which the programmable device is carried enters an operational phase in which software loading is authorized;
at least one on-board programmable device including
a software verification unit configured to enable detection of a corruption of at least one part of a software package of the on-board programmable device,
a signaling unit configured to signal an indication of the corruption to the on-board loading management device, and
a loading unit configured to enable replacement of the at least one corrupt part of the software with the loaded non-corrupt version, the loading unit being configured to delay loading of the software until the time when the aircraft in which the programmable device is carried enters the operational phase in which software loading is authorized; and
a software storage device configured to store a non-corrupt version of the software of the at least one on-board programmable device.

12. A non-transitory computer-readable storage medium including computer executable instructions, wherein the instructions, when executed by a computer, cause the computer to perform a method for for automatically reloading software, the method comprising:
detecting corruption of at least a part of a software package of a programmable device on board the aircraft;
automatically reloading, in response to detecting corruption, a non-corrupt version of the at least one corrupt part of the software in order to replace the at least one corrupt part of the software; and
delaying the reloading of the software until a time when the aircraft in which the programmable device is carried enters an operational phase in which software loading is authorized, the operational phase during which software loading is authorized being determined according to at least one of a position of the aircraft in relation to the ground, a speed of the aircraft, a state of engines of the aircraft, and a refueling state of the aircraft.

13. An aircraft comprising:
an on-board loading management device including
a notification processing unit configured to process a notification transmitted by a programmable device on board the aircraft indicating corruption of at least one part of a software package of the on-board programmable device, and
a loading unit configured to obtain a non-corrupt version of the at least one corrupt part of the software and load the non-corrupt version into the on-board programmable device in response to the notification, the loading unit being configured to delay loading of the software until a time when the aircraft in which the programmable device is carried enters an operational phase in which software loading is authorized; and
an on-board programmable device including a software verification unit configured to enable detection of a corruption of at least one part of a software package of the on-board programmable device, a signaling unit configured to signal an indication of the corruption to the on-board loading management device, and a loading unit configured to enable replacement of the at least one corrupt part of the software with the loaded non-corrupt version, the loading unit being configured to delay loading of the software until the time when the aircraft in which the programmable device is carried enters the operational phase in which software loading is authorized.

14. The aircraft according to claim 13, further comprising a software storage device configured to store a non-corrupt version of the software of the at least one on-board programmable device.

* * * * *

UNITED STATES PATENT AND TRADEMARK OFFICE
CERTIFICATE OF CORRECTION

PATENT NO. : 8,984,346 B2  
APPLICATION NO. : 13/546718  
DATED : March 17, 2015  
INVENTOR(S) : Anne Frayssignes et al.

Page 1 of 1

It is certified that error appears in the above-identified patent and that said Letters Patent is hereby corrected as shown below:

On the title page, Item 73, the Assignee's information is incorrect. Item 73 should read:

-- (73) Assignee: Airbus Operations SAS, Toulouse, (FR) --

Signed and Sealed this  
Eighth Day of December, 2015

Michelle K. Lee  
*Director of the United States Patent and Trademark Office*